United States Patent
Pishehvari et al.

(10) Patent No.: US 11,500,083 B2
(45) Date of Patent: Nov. 15, 2022

(54) METHOD FOR DETERMINING THE POSITION OF A VEHICLE

(71) Applicant: Aptiv Technologies Limited, St. Michael (BB)

(72) Inventors: Ahmad Pishehvari, Wuppertal (DE); Stephanie Lessmann, Erkrath (DE); Uri Iurgel, Wuppertal (DE); Lutz Roese-Koerner, Remscheid (DE)

(73) Assignee: Aptiv Technologies Limited, St. Michael (BB)

( * ) Notice: Subject to any disclaimer, the term of this patent is extended or adjusted under 35 U.S.C. 154(b) by 863 days.

(21) Appl. No.: 16/241,404

(22) Filed: Jan. 7, 2019

(65) Prior Publication Data

US 2020/0217943 A1 Jul. 9, 2020
US 2021/0396862 A9 Dec. 23, 2021

(30) Foreign Application Priority Data

Jan. 25, 2018 (EP) .................................... 18153439

(51) Int. Cl.
*G01S 13/06* (2006.01)
*B60W 40/105* (2012.01)
(Continued)

(52) U.S. Cl.
CPC .......... *G01S 13/06* (2013.01); *B60W 40/105* (2013.01); *B60W 40/114* (2013.01); *G01S 13/50* (2013.01)

(58) Field of Classification Search
CPC .. G01S 13/06; G01S 13/50; G01S 2013/9314; G01S 2013/9319; G01S 13/89;
(Continued)

(56) References Cited

U.S. PATENT DOCUMENTS 8,296,056 B2 * 10/2012 Becker .................. G01S 13/935
701/408
8,558,733 B2 * 10/2013 Kamo ..................... G01S 13/42
342/70
(Continued)

FOREIGN PATENT DOCUMENTS

CN 111366164 A * 7/2020 ............. G01C 21/30
DE 10148062 4/2003
(Continued)

OTHER PUBLICATIONS

"Extended European Search Report", EP Application No. 18153439. 7, dated Sep. 12, 2018, 14 pages.
(Continued)

*Primary Examiner* — Vladimir Magloire
*Assistant Examiner* — Alexander L. Syrkin
(74) *Attorney, Agent, or Firm* — Sawtooth Patent Group PLLC

(57) ABSTRACT

A method is described for determining the position of a vehicle equipped with a radar system that includes at least one radar sensor adapted to receive radar signals emitted from at least one radar emitter of the radar system and reflected the radar sensor. The method comprises: acquiring at least one radar scan comprising a plurality of radar detection points, wherein each radar detection point is evaluated from a radar signal received at the radar sensor and representing a location in the vicinity of the vehicle; determining, from a database, a predefined map, wherein the map comprises at least one element representing a static landmark in the vicinity of the vehicle; matching at least a subset of the plurality of radar detection points of the at least one scan and the at least one element of the map; determining the position of the vehicle based on the matching.

20 Claims, 11 Drawing Sheets

(51) Int. Cl.
*B60W 40/114* (2012.01)
*G01S 13/50* (2006.01)

(58) Field of Classification Search
CPC ........... G01S 13/878; G01S 2013/9316; G01S 2013/9318; G01S 2013/9322; B60W 40/105; B60W 40/114
USPC ........................................................ 342/146
See application file for complete search history.

(56) References Cited

U.S. PATENT DOCUMENTS

| | | | | |
|---|---|---|---|---|
| 8,633,849 | B2* | 1/2014 | Shibata | G01S 13/345 342/70 |
| 9,041,588 | B2* | 5/2015 | Yasugi | G08G 1/052 342/52 |
| 9,199,643 | B1* | 12/2015 | Zeng | B60W 40/10 |
| 9,618,608 | B2* | 4/2017 | Mizutani | G01S 13/04 |
| 2005/0259002 | A1* | 11/2005 | Erario | G01S 5/0027 342/146 |
| 2013/0325244 | A1* | 12/2013 | Wang | G05D 1/0011 701/26 |
| 2014/0043185 | A1* | 2/2014 | Quellec | G01S 13/426 342/146 |
| 2015/0022392 | A1* | 1/2015 | Hegemann | G01S 7/003 342/146 |
| 2016/0139255 | A1* | 5/2016 | Bueschenfeld | G01S 7/411 342/146 |
| 2018/0067491 | A1 | 3/2018 | Oder et al. | |
| 2019/0227145 | A1 | 7/2019 | Pishehvari et al. | |
| 2021/0141091 | A1 | 5/2021 | Pishehvari et al. | |
| 2021/0164800 | A1 | 6/2021 | Lessmann et al. | |
| 2021/0213962 | A1 | 7/2021 | Pishehvari et al. | |

FOREIGN PATENT DOCUMENTS

| | | | | |
|---|---|---|---|---|
| DE | 102016205227 | | 10/2017 | |
| DE | 102016214030 | | 2/2018 | |
| EP | 1584520 | | 10/2005 | |
| EP | 1707987 | A1 * | 10/2006 | ........... G01S 13/904 |
| EP | 3517996 | | 7/2019 | |
| WO | 2011023244 | | 3/2011 | |
| WO | WO-2017222385 | A1 * | 12/2017 | ............ G01S 13/90 |

OTHER PUBLICATIONS

"Foreign Office Action", EP Application No. 1853439.7, dated Jul. 14, 2020, 5 pages.
"Extended European Search Report", EP Application No. 19207813. 7, dated May 29, 2020, 15 pages.
"Extended European Search Report", EP Application No. 20151644. 0, dated May 29, 2020, 15 pages.
"Extended European Search Report", EP Application No. 19212492. 3, dated Jun. 2, 2020, 14 pages.
"Foreign Office Action", EP Application No. 18153439.7, dated Dec. 4, 2020, 5 pages.
Besl, et al., "A Method for Registration of 3-D Shapes", Feb. 1992, pp. 239-255.
Biber, "The Normal Distributions Transform: A New Approach to Laser Scan Matching", Nov. 2003, 6 pages.
Borenstein, et al., "Correction of Systematic Odometry Errors in Mobile Robots", Aug. 1995, pp. 569-574.
Bosse, et al., "Histogram Matching and Global Initialization for Laser-only SLAM in Large Unstructured Environments", Apr. 2007, pp. 4820-4826.
Burnikel, et al., "How to Compute the Voronoi Diagram of Line Segments: Theoretical and Experimental Results", Max Planck Institute for Informatics, DOI: 10.1007/BFb0049411, Apr. 2006, 14 pages.
Censi, "An ICP Variant Using a Point-to-line Metric", Jun. 2008, 7 pages.
Censi, et al., "Scan Matching in the Hough Domain", Jan. 2005, 6 pages.
Checchin, et al., "Radar Scan Matching SLAM using the Fourier-Mellin Transform", Jan. 2009, 10 pages.
Cole, et al., "Using Laser Range Data for 3D SLAM in Outdoor Environments", Jun. 2006, 9 pages.
Diosi, et al., "Laser Scan Matching in Polar Coordinates with Application to SLAM", Sep. 2005, 6 pages.
Haklay, et al., "OpenStreetMap: User-Generated Street Maps", Oct. 2008, pp. 12-18.
Kirchner, et al., "Der Laserscanner ALS Intelligenter KZF-Sensor", Jan. 1, 1998, pp. 26-32, 34.
Levinson, et al., "Robust Vehicle Localization in Urban Environments Using Probabilistic Maps", Jun. 2010, 7 pages.
Lingermann, et al., "Indoor and Outdoor Localization for Fast Mobile Robots", Jan. 2004, 6 pages.
Lu, "Robot Pose Estimation in Unknown Environments by Matching 2D Range Scans", Nov. 1997, pp. 249-275.
Minguez, et al., "Metric-Based Iterative Closest Point Scan Matching for Sensor Displacement Estimation", Nov. 2006, 7 pages.
Nister, et al., "Visual Odometry", Jul. 2004, 8 pages.
Pishehvari, et al., "Ego-pose estimation via Radar and Openstreetmap-based Scan matching", May 2018, 8 pages.
Pishehvari, et al., "Robust Range-Doppler Registration with HD Maps", Apr. 2020, 9 pages.
Schwertfeger, et al., "Map Evaluation Using Matched Topology Graphs", Sep. 2015, 27 pages.
Streller, et al., "Object Tracking in Traffic Scenes with Multi-Hypothesis Approach Using Laser Range Images", Sep. 30, 2001, 8 pages.

* cited by examiner

METHOD FOR DETERMINING THE POSITION OF A VEHICLE

TECHNICAL FIELD OF INVENTION

The invention relates to a method for determining the position of a vehicle.

BACKGROUND OF INVENTION

Vehicles known from the state of the art are capable of determining their current position on the basis of a least one sensor mounted on the vehicle. For example, many vehicles comprise a global-positioning system (GPS) from which the position of the vehicle can be inferred with a fair degree of accuracy. The determination of the position by means of a GPS requires a radio signal from the satellite space, which is, however, not always readily available. For example, the required GPS-signal can be very weak so that a relatively long time span is necessary in order to evaluate the position from the signal. Sometimes, the signal is too weak in order to securely determine the position. In other circumstances, there is even no signal available, for example, in fully or partially enclosed vicinities, such as road tunnels and buildings, in particular subterranean garages. Therefore, no position can be determined at all. As another problem, the accuracy of GPS is sometimes not sufficient, for example for autonomous-driving applications.

Modern vehicles, for example upper-class cars, are already equipped with radar and/or lidar (light detection and ranging) systems. Corresponding measurements, i.e. scans, alone are, however, not suitable for determining the position with sufficient reliability and accuracy. The same problem occurs with one or more motion sensors mounted on the vehicle. In particular, most of such measurement methods, e.g., radar, are prone to produce outlier detection points which represent non-valid locations and can significantly corrupt the accuracy of a position determined on the basis of a plurality of detection points.

SUMMARY OF THE INVENTION

Described herein is a method adapted for determining the position of a vehicle equipped with a radar system, wherein the radar system includes at least one radar sensor adapted to receive radar signals emitted from at least one radar emitter of the radar system and reflected in a vicinity of the vehicle towards the radar sensor. The method comprises: acquiring at least one radar scan comprising a plurality of radar detection points, wherein each radar detection point is evaluated from a radar signal received at the radar sensor and representing a location in the vicinity of the vehicle; determining, from a database, a predefined map, wherein the map comprises at least one element representing a static landmark in the vicinity of the vehicle; matching at least a subset of the plurality of radar detection points of the at least one scan and the at least one element of the map; determining the position of the vehicle based on the matching.

It has been found that radar measurements are in principle well suited for robust measurement of the vicinity of a vehicle. In particular, radar has advantages over optical measurements during sub-optimal weather conditions such as rain and fog. However, as pointed out above, determining the position of the vehicle on the basis of radar scans can has shortcomings with regard to accuracy and reliability. This is because a radar scan usually comprises a plethora of raw radar detection points from which only a portion represent valid measurements, e.g., due to noise. Therefore, it is found that some sort of processing, i.e. filtering, of the raw detection points is usually required. However, standard approaches of processing are not always sufficient in order to reliably and accurately determine the position of a vehicle. Although radar systems can provide many measurements per time span, there is a limitation to distance and angle information per time instant relative to the underlying vehicle. Therefore, tracking the position of the vehicle over time based on an initialization position and subsequent radar scans is not sufficient for accurate determination of the position of the vehicle, which can also be denoted as ego-pose estimation. In this regard, it is proposed to make use of some ground-truth data, which is configured to represent the vicinity of the vehicle. This ground-truth data is provided in form of a database, which comprises map data that preferably represents a geo-structural model. The map data describes the vicinity of a desired driving area, which preferably comprises characteristic objects, i.e. static landmarks limiting a desired driving area of a vehicle. Examples for such landmarks are walls, fences but also substantial pavement edges and bigger plants, e.g., trees and the like. Although such objects will usually limit a driving area, the map data is not limited thereto. This is to say that the map data can also comprise landmarks which are not directly relevant for defining an allowable driving space. In principle, the map data can comprise descriptions of those objects which will be sensed by a radar system in the vicinity thereof.

The map data stored in the database comprises representations of static landmarks in form of so-called elements. These elements are of mathematical nature and are preferably simplified and parametric models of the objects which they describe, as will be explained in greater detail below. Due to the mathematical or "modelled" nature of the elements they can also be denoted as native elements, i.e. elements which are defined from scratch. In particular, each of the elements comprises information about its global position, i.e. in a world coordinate system. In contrast, detection points acquired by means of a radar system of a vehicle typically only comprise information about a relative position, i.e. the detection points are typically described in a coordinate system of the vehicle which can be defined by means of a coordinate system of the sensor system. This means that the detection points, which can be measured with respect to a sensor coordinate system, can be transformed into a coordinate system of the vehicle.

The map data in the database can comprise map data which captures a desired driving area, for example all valid driving areas in a given country or a group of different countries. From this map data a predefined map is determined, wherein the predefined map can be limited to a current vicinity of the vehicle. This current vicinity can be limited to a specified range of the radar system so that the predefined map includes only those elements within the range, i.e., those objects which are potentially hit by radar signals emitted from the radar system. Therefore, the step of determining the predefined map comprises identifying a portion of the map which corresponds to a current "view" of the radar system, thereby providing a geo-structural description of the local vicinity of the vehicle at a given time instant. The predefined map can be determined on the basis of a position information derived from a current GPS-signal received at the vehicle. If such a signal is currently not available the last GPS-signal or another inaccurate position estimation may be used.

Each of the plurality of elements of the predefined map represents a static landmark in the vicinity of the vehicle. Therefore, a given element is associated with a maximum likelihood of being causal for the location represented by at least some detection points. The predefined map can be navigation map, in particular a navigation map from a publicly available database, e.g. open-street map. The predefined map can be derived from a global database on the basis of a given position of the vehicle, e.g. from a global position system of the vehicle, as indicated further above. The static landmarks can be static objects, e.g. walls of buildings or other barriers for the vehicle which form objects detectable by the sensor system of the vehicle.

The predefined map, i.e. the at least one element thereof, is then matched with at least a subset of the plurality of radar detection points. The plurality of radar detection points are acquired by means of one or more scans, wherein in the latter case, the scans are preferably successive scans. The radar detection points can be raw detection points or filtered by means of a preprocessing method. As such, the subset of the plurality of detection points used for the matching can be a selection of the raw detection points. Preferably, the detection points correspond to a substantially common time instant, which may also be a short time span.

The term "matching" can be understood in the sense of evaluating a correspondence between the radar detection points and the elements. In principle, since each radar detection point has an uncertainty with respect to the location it represents, the elements—as a ground truth—can be used to find a location with an increased certainty (i.e., the elements are used to reduce the uncertainty with respect to detection points). This is because the elements represent static landmarks which should be detected from the radar system, i.e., at least a substantial portion of the radar detection points should lie on the elements within the range of the radar system. If a respective detection point does not lie on an element, this can be an indication that the radar detection point is subject to an error. Therefore, the elements can be used to perform a correction of the radar detection points, in particular of those detection points nearby a respective element. This will be explained in greater detail further below.

The position of the vehicle is determined on the basis of the matching. This is to say that the correspondence between the radar detection points and the elements is exploited for the determination of the position. In general, the position can be determined from any appropriate sensor measurement or a combination thereof. The combination proposed here, namely radar detection points and elements, can be sufficient to determine the position. The matching allows to increase the accuracy of the position determination. Beyond radar detection points and the elements of the predefined map, additional sensor measurements can be used for determining the position, e.g., from one or more motion sensors of the vehicle.

Although the methods described herein use a radar system of a vehicle, it is understood that the methods may also be adopted using detection points of a lidar system instead of a radar system. Combinations of radar and lidar detection points may also be possible.

Preferably, the position of the vehicle comprises coordinates representing a location of the vehicle with respect to a coordinate system. Furthermore, the position can comprise an angle of the vehicle representing a heading, i.e. an orientation of the vehicle with respect to a reference heading.

In one embodiment, the method can be implemented in a vehicle in order to provide one or more autonomous-driving applications requiring accurate information about a current position of the vehicle. One such application is valet parking in a parking level, wherein the vehicle automatically drives into a desired parking space without requiring motor and steering control of the driver. This is to say that the driving behaviour of the vehicle (i.e. "the vehicle") is controlled or modified with respect to the determined position of the vehicle.

Advantageous embodiments of the invention are specified in the dependent claims, the description and the drawings.

According to a preferred embodiment, the method does not comprise using data from a space-based radio-navigation system, in particular a global positioning system, of the vehicle. In this connection, the elements preferably comprise positional data which is used to determine the position of the vehicle. In particular, the elements provide information about the absolute position of the landmarks in the vicinity of the vehicle and the radar detection points provide information about the position of the vehicle relative to the elements. In this way, the position of the vehicle can be determined with greater accuracy and also with increased reliability without the requirement of having a sufficient connection to a GPS-signal.

Having regard to the predefined map, the at least one element of the map can comprise an extended geometrical object, in particular a line or a surface, preferably a straight line or a plane. Each element can represent exactly one static landmark. Since the elements correspond to static landmarks modelled for a map, the elements can also de denoted as native elements. It has turned out that in most cases a straight line is sufficient in order to describe a static landmark for the purpose of the methods described herein. A straight line has the advantage that it can be described with a small number of parameters, for example, the coordinates of a starting point and an end point of the line. Preferably, a straight line is described as a mathematical function, i.e., $f(x)=ax+b$, possibly limited by a starting point and an end point. This is to say that a straight line is described by a mathematical function only, with optional limitation parameters specifying and a starting and/or an end point of the line.

Moreover, using straight lines has advantages with regard to a low computational load associated with the processing of the method, in particular with regard to the matching ("point-to-line matching"). A line can be used to describe geo-structural limitations in, two dimensions, which can be advantageous for efficient processing. Three-dimensional limitations may be explicitly described by surfaces.

It is understood that a landmark can be described by exactly one element (e.g., a line) or more than one element. Each element can be formed by a straight line but other types of lines are also possible, for example curved lines. A landmark can also be described by several sections forming elements.

As mentioned above, the accuracy of the position determined by the method can be improved by a (pre-) filtering, i.e. processing of the raw radar detection points (the detection points which are evaluated by the radar system without any weighting but possibly including a prior selection of detection points being evaluated from radar signals having sufficient signal strength and representing static locations with respect to a Doppler-shift information of the radar system). In this regard, the method can comprise determining, by means of a pre-filtering of the plurality of radar detection points, the subset of the plurality of radar detection points to be matched, wherein the pre-filtering comprises conducting at least or exactly two steps for each radar detection point of the plurality of radar detection points. These steps are (i) identifying, from the at least one element of the map, a respective element having a minimum distance to a respective one of the plurality of radar detection points, (ii) assigning the respective element so identified to the respective one of the plurality of radar detection points if the distance is below a predefined threshold, wherein the subset of the plurality of radar detection points includes all radar detection points from the plurality of radar detection points to which an element has been assigned. With regard to step (i), preferably the Euclidian, i.e. orthogonal distance metric is used. In this way, the nearest element is identified for each radar detection point. In step (ii), all radar detection points which are "too far away" from the nearest element are filtered away, i.e. are discarded for the matching. In turn, only those radar detection points within a threshold or "tolerance" band survive the pre-filtering and are used for the matching and the subsequent determination of the position. In this way, the accuracy and reliability of the method is further increased because those detection points which are a-priori not likely to represent a valid detection point of a static landmark (i.e. element) are discarded. A further advantage is the assignment of a respective radar detection point to a "dedicated" element. Although a given radar detection point can be assigned to more than one element, e.g., when several elements have a substantially equal distance to a respective detection point, the assignment to a single detection point (forming pairs of respective radar detection points and assigned elements) has shown to provide the desired increase of accuracy while also reducing the computational load.

The pre-filtering can be regarded as a plausibility constraint because the physical basis of each detection point (located on a static landmark) should not be too far away from the measured location. Otherwise, a detection point is preferably discarded, e.g., for the determination of the position of the vehicle. In this way, it is also avoided that an error is accumulated during successive estimations of the position of the vehicle.

As an alternative to the pre-filtering described above or additionally, the method can further comprise determining, by means of a pre-filtering of the plurality of detection points, the subset of the plurality of detection points, wherein the pre-filtering comprises, for each detection point of the plurality of detection points, (i) identifying, from the plurality of elements of the predefined map, an element having a minimum distance to the detection point, (ii) assigning the detection point to the identified element, (iii) assigning the detection point to the subset of the plurality of detection points if the distance between the detection point and a complementary element is below a second predefined threshold, wherein the complementary element is evaluated on the basis of the detection points being assigned to the identified element, wherein the number of detection points being assigned to the identified element and to the complementary element is maximized. The complementary element is preferably a straight line being evaluated by means of simple linear regression on the basis of a set of randomly chosen detections points which are assigned to a respective element of the predefined map. Preferably, the set of randomly chosen detection points is only a portion of the overall number of detection points assigned to the identified element. The step of randomly choosing detection points can be repeated a number of times. Afterwards, the set which leads to the maximum number of detection points being assigned to both the identified element (of the predefined map) and the complementary element (for the respective random set) is chosen as the subset of detection points "surviving" the pre-filtering. The general approach is sometimes also referred to as random sample consensus (RANSAC).

According to another embodiment, the matching comprises determining a rigid transformation function (also denoted as rigid body transformation function) by minimizing distances between transformed radar detection points and the one or more elements assigned to the plurality of radar detection points, wherein the transformed radar detection points represent the subset of the plurality of radar detection points transformed by means of the rigid transformation function. Preferably, the rigid transformation function is determined by minimizing the sum of the Euclidian distances between each transformed radar detection point and the element assigned to this detection point. In particular, determining the rigid transformation function can comprise minimizing the expression $$F(P, R, t) = \sum_{i=1}^{m}\left[n_i^T(Rp_i + t) - b_i\right]^2,$$

wherein
P represents the subset of m radar detection points,
R represents a rotation,
t represents a translation,
$p_i$ represents the i-th radar detection point of P,
$b_1$ represents the orthogonal distance to the element assigned to the i-th radar detection point of P,
$n_i^T$ represents the transpose of a normal vector with respect to the element assigned to the i-th radar detection point of P.

The rigid transformation function can be interpreted as a transformation of the coordinate system used for describing (the locations of) the detection points. This is that all radar detection points are transformed in the same way. In this regard, the error function F represents the sum of the squared Euclidian (i.e., orthogonal) distances between the transformed detection points and the assigned elements. Each detection point $p_i$ and corresponding normal vector $n_i^T$ is preferably formed by a two-dimensional vector, respectively (vector with respect to the origin of the coordinate system). The distance $b_i$ is preferably a scalar giving the orthogonal distance between the origin of the coordinate system and the respective element. The rigid transformation function is one way to describe the correspondence between the elements of the predefined map and the radar detection points. For example, the rigid transformation function can be applied to the plurality of radar detection points, thereby "correcting" the radar detection points. However, the rigid transformation function can also be applied to other position measurements of the vehicle, in particular to subsequently evaluated detection points or subsequently determined positions of the vehicle.

According to another embodiment, determining the rigid transformation function involves a probabilistic model, wherein at least one parameter of the probabilistic model represents an expected variance of at least a respective one of the plurality of radar detection points, wherein the expected variance is non-constant. In this way, the uncertainty of the measurement of the radar detection points can be taken into account, thereby further increasing the accuracy of the determination of the position of the vehicle. The expected variance can be expressed by a covariance matrix, which can be individual for each detection point. The covariance matrix can determined by a parametric function such as the distance between the sensor system and the location represented by the detection point.

The probabilistic model can be of the type of a so-called Gauss-Helmert-Model, which is described in greater detail, e.g., in "K.-R. Koch: Parameterschaetzung and Hypothesentests in linearen Modellen. Ehemals Ferd. Dümmlers Verlag, Bonn, 2004". The probabilistic model can be the Gauss-Helmert-Model described therein. It is understood that this model can be used in the context of the applications described herein.

In a particular embodiment, the expected variance of the radar detection point can comprise a first component and a second component, wherein the first component represents the expected variance with respect to a distance between the location in the vicinity of the vehicle represented by the radar detection point and the radar sensor at which the radar signal (from which the radar detection point is evaluated) is received, wherein the second component represents the expected variance with respect to an angle identifying a direction of the location in the vicinity of the vehicle represented by the radar detection point relative to the radar sensor at which the radar signal (from which the radar detection point is evaluated) is received, and wherein the first component is smaller than the second component. In other words, the expected variance has a distance and an angular component, wherein the angular component has a greater uncertainty than the distance component. Therefore, the major axis of the ellipse, which represents the expected variance, is getting larger when the distance gets larger (the major axis is transverse to the line of sight). This modelling adds in increasing the accuracy of the determination of the vehicle's position.

As an example of minimizing the above error function F, consider again the m detection points, each having coordinates in directions x and y:

$$p=(p_1\ p_2\ \ldots\ p_m)^T \in R^{m\times 1}, p_i=(p_{ix}\ p_{iy})^T$$

A rotation and a translation can be described by:

$$R(\Phi) = \begin{pmatrix} \cos(\Phi) & -\sin(\Phi) \\ \sin(\Phi) & \cos(\Phi) \end{pmatrix}, t = \begin{pmatrix} t_x \\ t_y \end{pmatrix}.$$

For linearizing the error function F, a Taylor series expansion can be adopted with split-ups of the detection points and the optimum parameter $D^*=[t_x^*, t_y^*, \Phi^*]^T$.

$$\tilde{p} = p + V = \underbrace{p - p_0}_{\Delta p} + p_0 + V = p_0 + \Delta p + V$$

$$\tilde{D}^* = D_0^* + \Delta D^*, \text{ wherein}$$

$$z_0 = [D_0^*, p_0]^T,$$

$$\tilde{D}^* = D_0^* + \Delta D^*$$

wherein $$z_0 = [D_0^*, p_0]^T$$

is the Taylor point and V is an improvement term. The minimization of F as can be solved as $$F(\tilde{p}, \tilde{D}^*) = \underbrace{F(p, D^*)|_{p=p_0, D^*=D_0^*}}_{\omega_0} + \underbrace{\nabla_p F(p, D^*)|_{p=p_0, D^*=D_0^*}}_{\overline{B}_{GHM}^T}$$

$$(\Delta p + V) + \underbrace{\nabla_x^* F(p, D^*)|_{p=p_0, D^*=D_0^*}}_{A} \Delta D^* =$$

$$\underbrace{\omega_0 + \overline{B}_{GHM}^T \Delta p}_{\omega} + \overline{B}_{GHM}^T V + A\Delta D^* = 0$$

which can be simplified by Lagrangians to $$\begin{pmatrix} \overline{B}_{GHM}^T \Sigma \overline{B}_{GHM} & A \\ A^T & 0 \end{pmatrix} \cdot \begin{pmatrix} \overline{k}_{GHM} \\ \Delta D^* \end{pmatrix} = \begin{pmatrix} -\omega \\ 0 \end{pmatrix},$$

wherein the detection points have individual covariance matrices written as $$\Sigma = \begin{pmatrix} \Sigma_1 & & & \\ & \Sigma_2 & & 0 \\ & & \ddots & \\ & 0 & & \Sigma_m \end{pmatrix} \updownarrow m =$$

$$\underbrace{\begin{pmatrix} \begin{pmatrix} \sigma_{1xx} & \sigma_{1xy} \\ \sigma_{1yx} & \sigma_{1yy} \end{pmatrix} & & & \\ & \begin{pmatrix} \sigma_{2xx} & \sigma_{2xy} \\ \sigma_{2yx} & \sigma_{2yy} \end{pmatrix} & 0 & \\ & & \ddots & \\ & 0 & & \begin{pmatrix} \sigma_{m_{yx}} & \sigma_{m_{xy}} \\ \sigma_{m_{yx}} & \sigma_{m_{yy}} \end{pmatrix} \end{pmatrix}}_{2m} \updownarrow 2m.$$

This "global covariance matrix" for all detections, e.g. of one or more scans, can be weighted element-wise with weights $$W_i, i=1, \ldots, m,$$

$$\tilde{\Sigma}_i = \Sigma_i \cdot W_i,$$

wherein each entry of each covariance matrix is multiplied with the weight that is individual for the corresponding detection point.

A weight can include a first weighting factor and/or a second weighting factor, wherein the first weighting factor represents a quantity of detection points in a first group of detection points and the second weighting factor represents a quantity of detection points in a second group of detection points. Furthermore, the detection points of the first group share a first geometrical object and the detection points of the second group share a second geometrical object. The second geometrical object is determined from a predefined map representing the vicinity of the vehicle, and the first geometrical object is determined independently from the predefined map.

A weight can be evaluated for a given detection point $p_i$ (with i=1, 2, . . . , m) comprising multiplying a first weighting factor and a second weighting factor, wherein the first weighting factor can be defined as $$w_1 = e^{-\left(\gamma\left(\frac{M_p - |G_{p_i}|}{M_p}\right)\right)},$$

wherein $M_p$ is a maximum quantity with respect to a first group associated with the given detection point $p_i$, $|G_{p_i}|$ is the quantity of the first group, and $\gamma$ is a free parameter, wherein the second weighting factor can be defined as $$w_2 = e^{-\left(\sigma\left(\frac{M_{map}-|N_\gamma|}{M_{map}}\right)\right)},$$

wherein $M_{map}$ is the maximum quantity with respect to the second group associated with the given detection point $p_i$, $|N_\gamma|$ is the quantity of the second group, and $\sigma$ is a free parameter.

The parameters $\gamma$ and $\sigma$ influence how quickly the respective exponential function e decays. As the skilled person understands, both weighting factors are limited to the range (0, 1] and are thus expressed on a predefined scale. Subtracting the determined quantities $|G_{p_i}|$, $|N_\gamma|$ from the maximum quantities $M_p$, $M_{map}$ and dividing by $M_p$, $M_{map}$ in the exponential terms of the first and second weighting factors, respectively, is one way of normalizing the determined quantities to the maximum quantity. As the skilled person understands the above expressions of the weighting factors are only one exemplary formulation and other, i.e. derived expressions may be used to achieve the same desired weighting behaviour. An inverse representation of the weight can be given by inverting the two weighting factors; that is to change the minus signs of the exponential terms into plus signs. The inverted weighting factors may be applied to the covariance matrix as described above. Scaling the covariance matrix inversely with respect to the weight can have the effect of increasing the uncertainty the less weight should be given to the detection point. Therefore, the increased uncertainty can be taken into account during determination of the position, thereby reducing the impact of the weighted detection point on the result.

The method preferably further comprises determining, from a motion model of the vehicle, a preliminary position of the vehicle, wherein determining the position of the vehicle comprises transforming the preliminary position by means of the rigid transformation function. The motion model can be a model which describes the trajectory of the vehicle over time. The model can be initialized with some value and is then periodically updated based on motion measurements of the vehicle. In this regard, the motion model is preferably determined on the basis of at least one measurement from at least one motion sensor of the vehicle and/or on the basis of at least some of the plurality of radar detection points. The combination of measurements from a motion sensor and a radar system can further enhance the accuracy of the method.

The measurement from the at least one motion sensor can comprise a velocity and/or a yaw rate of the vehicle, wherein the vehicle preferably comprises corresponding sensor facilities. This is also known as "dead-reckoning" measurements. Preferably, the velocity and/or the yaw rate of the vehicle is determined on the basis of wheel-speed-sensor (wheel rotation per time span) measurements and/or yaw-rate-sensor measurements, and/or on the basis of the radar detection points.

Dead-reckoning measurements taken alone have been found to provide inaccurate estimations of the vehicle position under certain conditions, e.g., during strong steering maneuvres. For this reason, the estimation based on dead-reckoning can represent a preliminary estimation of the vehicle's position. The rigid transformation function can be applied to the preliminary position in order to arrive at a final position which has greater accuracy than the preliminary position:

$$\underbrace{\begin{pmatrix} x_{sm} \\ y_{sm} \\ \theta_{sm} \end{pmatrix}}_{P_{sm}} = \begin{pmatrix} \cos(\Phi) & -\sin(\Phi) & 0 \\ \sin(\Phi) & \cos(\Phi) & 0 \\ 0 & 0 & 1 \end{pmatrix} \cdot \underbrace{\begin{pmatrix} x_{dr} \\ y_{dr} \\ \theta_{dr} \end{pmatrix}}_{P_{dr}} + \begin{pmatrix} t_x \\ t_y \\ \Phi \end{pmatrix}, \text{ wherein } P_{dr}$$

is the preliminary, i.e. inaccurate position of the vehicle and $P_{sm}$ is the corrected position which may be denoted as "scan-matching position", and wherein the rigid transformation function is determined by the optimized parameter vector $D=(t_x,t_y,\Phi)^T.$ According to another embodiment, the subset or all of the plurality of radar detection points used for matching includes radar detection points from a plurality of successive radar scans of the radar system, in particular 1 to 20 scans, preferably 10 scans, wherein the scan rate is between 10 to 40 Hz, preferably 20 Hz.

The invention further relates to a vehicle equipped with a radar system, wherein the radar system includes at least one radar sensor adapted to receive radar signals emitted from at least one radar emitter of the radar system and reflected in a vicinity of the vehicle towards the radar sensor, and a control and processing unit, wherein the control and processing unit is configured to carry out the method according to at least one of the preceding embodiments. The control and processing unit may comprise a storage device in which instructions implementing embodiments of the described methods are stored. Preferably, the method can be carried out without a mobile connection to a central server or the like. Therefore, the storage device can also comprise a database including data for determining a predefined map representing the vicinity of the vehicle. However, as the skilled person understands, use of a mobile connection can be made for updating or incorporating data while carrying out the method.

BRIEF DESCRIPTION OF DRAWINGS

The invention is described further in the following by means of exemplary embodiments shown in the drawings in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

In the figures, the same or corresponding elements are indicated with the same reference signs.

Figure 1:
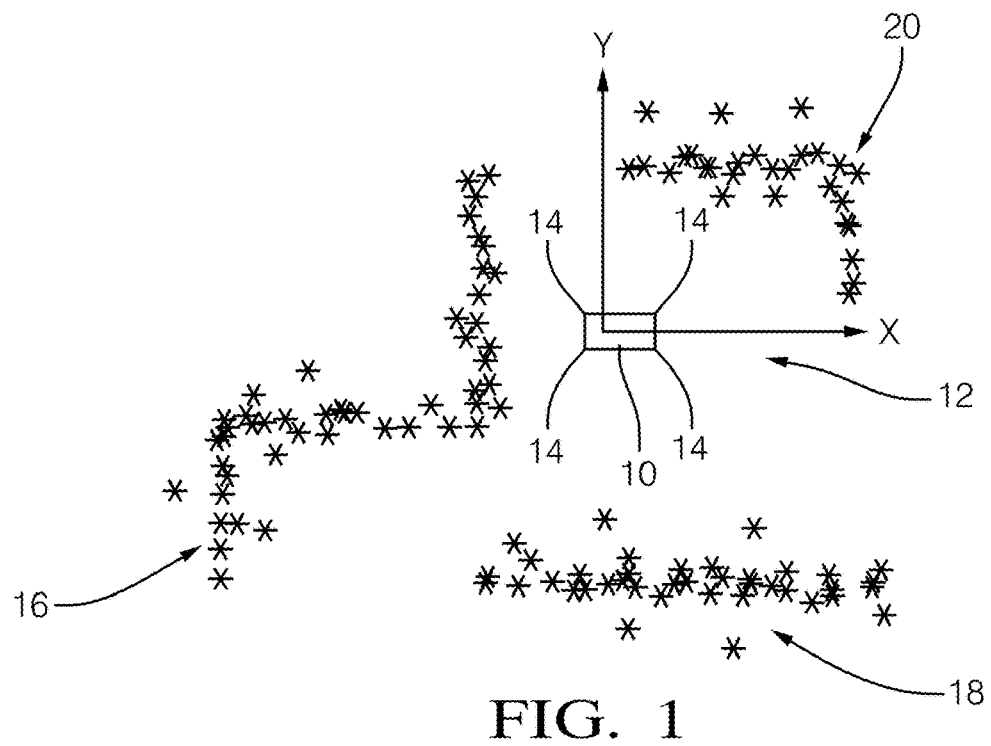
FIG. 1 is a schematic illustration of a vehicle and a plurality of detection points in a vehicle coordinate system.
Figure 2:
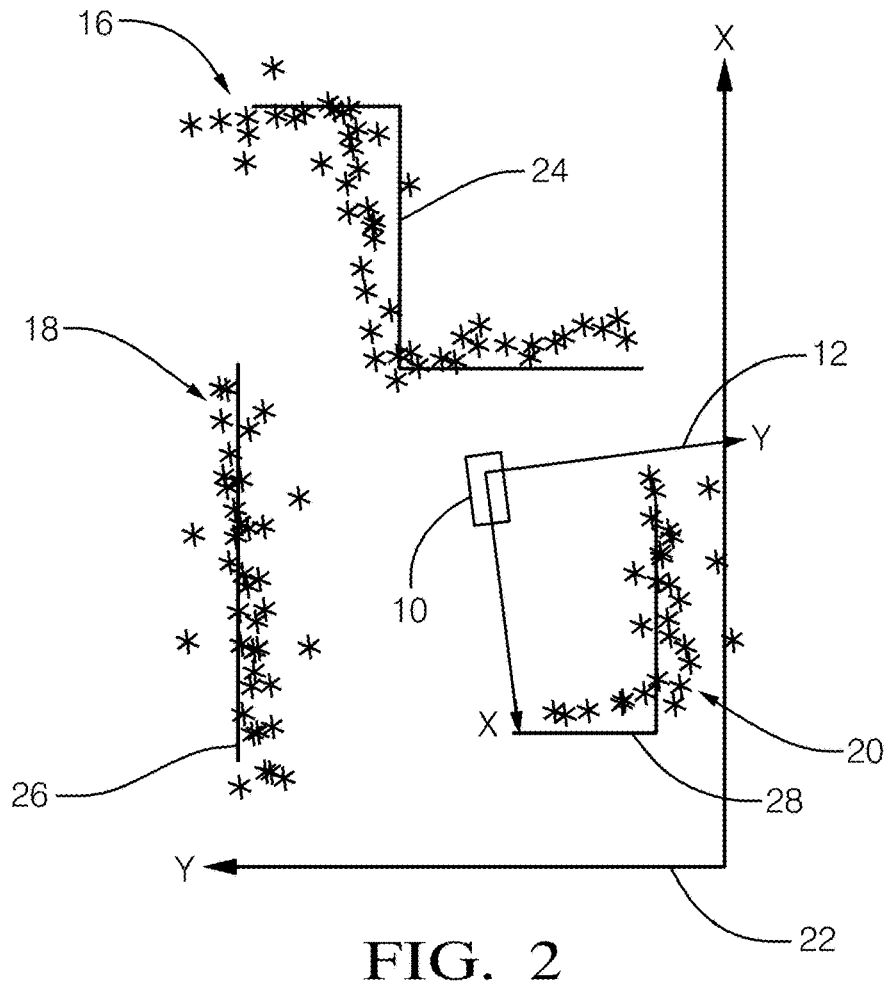
FIG. 2 is the schematic illustration of FIG. 1 transformed into a world coordinate system and additionally showing a plurality of elements of a predefined map.
Figure 3:
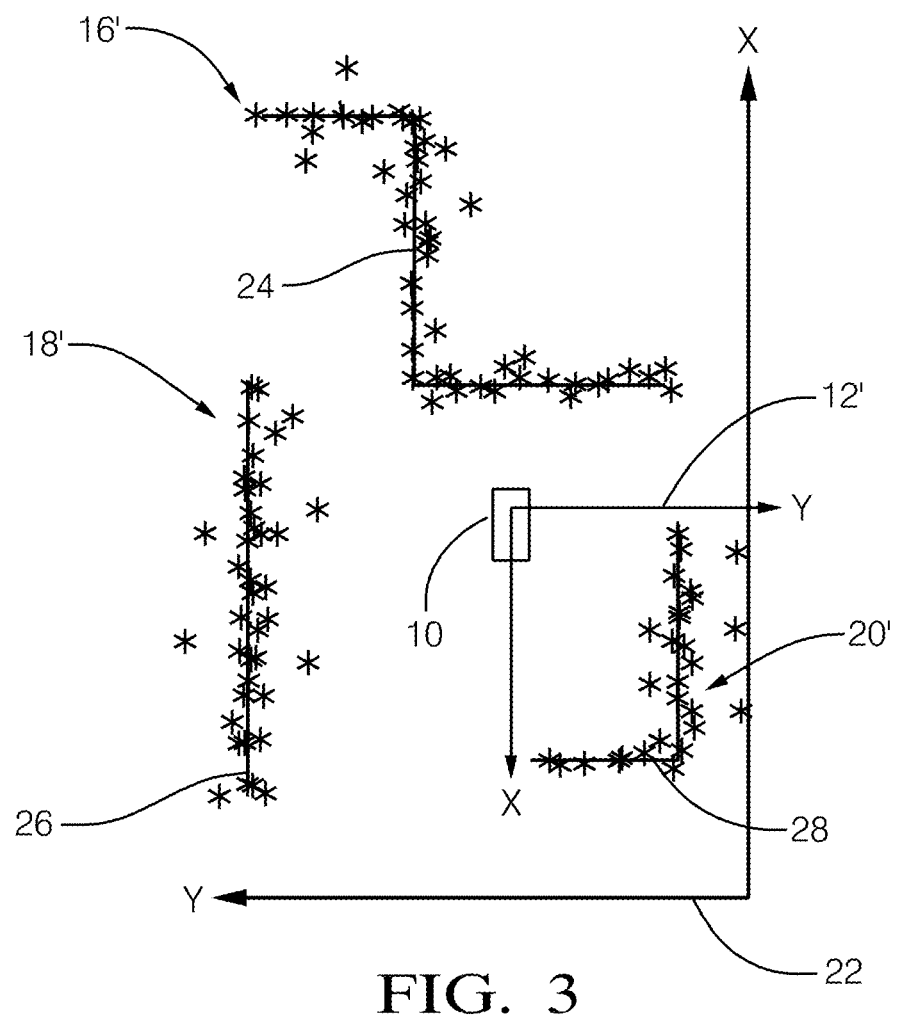
FIG. 3 is the schematic illustration of FIG. 2, wherein the vehicle and the detection points are transformed by means of a rigid body transformation function.

FIGS. 1 to 3 provide a basic illustration of a matching procedure in the context of the methods described herein. In FIG. 1, a schematic of a vehicle 10 is positioned in the origin of a coordinate system 12 of the vehicle 10. The vehicle coordinate system 12 is indicated as a Cartesian coordinate system with axes x and y in orthogonal relation to each other, wherein the vehicle's heading is aligned with the x-axis of the coordinate system 12.

The vehicle 10 has a radar system comprising a total of four pairs 14 of radar sensors and radar emitters, which are positioned in each of the corners of the vehicle 10. Therefore, the vehicle 10 is configured to "look" within an angle range of 360 degrees around the vicinity of the vehicle 10. It is understood that the vehicle 10 can have a different number of radar sensors and emitters which also can be positioned in a different configuration than shown in FIG. 1.

In FIG. 1, a plurality of detection points is arranged in groups 16, 18, and 20 around the vehicle 10, wherein each detection point is indicated with a star and illustrates a location in the vicinity of the vehicle 10. The detection points are acquired by means of the radar system in one or more scans.

FIG. 2 corresponds to FIG. 1, wherein the vehicle 10 and the vehicle coordinate system 12 are shown with respect to a world coordinate system 22 which is also a Cartesian coordinate system with axes x and y and which can be a coordinate system of the predefined map. However, the detection points 16, 18, 20 are shown with respect to the vehicle coordinate system 12. Additionally, FIG. 2 shows a plurality of elements 24, 26, and 28 with respect to the world coordinate system 22. These elements 24, 26, 28 represent static landmarks in the vicinity of the vehicle 10. In particular, the elements 24, 26, 28 represent walls of a building or groups of walls. The elements 24 and 28 for example comprise different sub-elements, each of the sub-elements formed by a straight line in orthogonal relation to an adjacent line. Each straight line may be handled separately as a single element, as will be explained further. It is understood that the elements 24, 26, 28 may form a predefined map with regard to the vehicle 10 and that the elements 24, 26, 28 are computer-implemented representations of real static landmarks, i.e. objects. In the examples throughout the figures, the static landmarks represented by the elements are formed by grid-like fences. This means that, e.g., radar signals, may be partially reflected and partially passing through the fences leading to a plurality of detection points located in substantially different distances from the sensor system, e.g., in front, on, or behind a respective element (cf., e.g., FIG. 5, detection point 48 relative to vehicle 10 and the element 43 in between). This is a particularly challenging application scenario which shows the merits of the invention well.

As can readily be seen from FIG. 2, the elements 24, 26, 28 show a geometrical correspondence with the groups of detection points 16, 18, and 20. In fact, it can be assumed that the elements 24, 26, 28 are causal for the groups of detection points 24, 26, 28, respectively. However, there is an angular displacement between the elements 24, 26, 28 and the detection points 16, 18, 20. This displacement corresponds with an inaccurate position of the vehicle 10 with respect to the world coordinate system 22. This inaccurate position can be denoted as a preliminary position estimated on the basis of, e.g., motion sensors of the vehicle 10 ("dead reckoning"), and a motion model can be used for estimating the preliminary position (also denoted as preliminary ego-pose).

Having regard to compensating the mentioned angular displacement, a matching procedure comprises first to evaluate the correspondence, i.e. the relationship between the elements 24, 26, 28 and the detection points 16, 18, 20. This is to find a transformation function which can be used to correct the inaccurate position. This transformation function can be a rigid transformation function including a translation and a rotation. This is to say that there can also be a translational displacement and not only an angular displacement between the detection points 16, 18, 20 and the elements 24, 26, 28 as shown in FIG. 2. The step of actually compensating, i.e. correcting the preliminary position by means of the evaluated transformation function can be the second step of the matching procedure. A corresponding result is illustrated in FIG. 3, in which the inaccurate position of the vehicle 10 from FIG. 2 has been corrected by means of transforming the vehicle coordinate system 12 with respect to the rigid transformation function (cf. vehicle coordinate system 12'). Accordingly, the transformed detection points 16', 18', 20' now approximately match with the elements 24, 26, 28.

Figure 4:
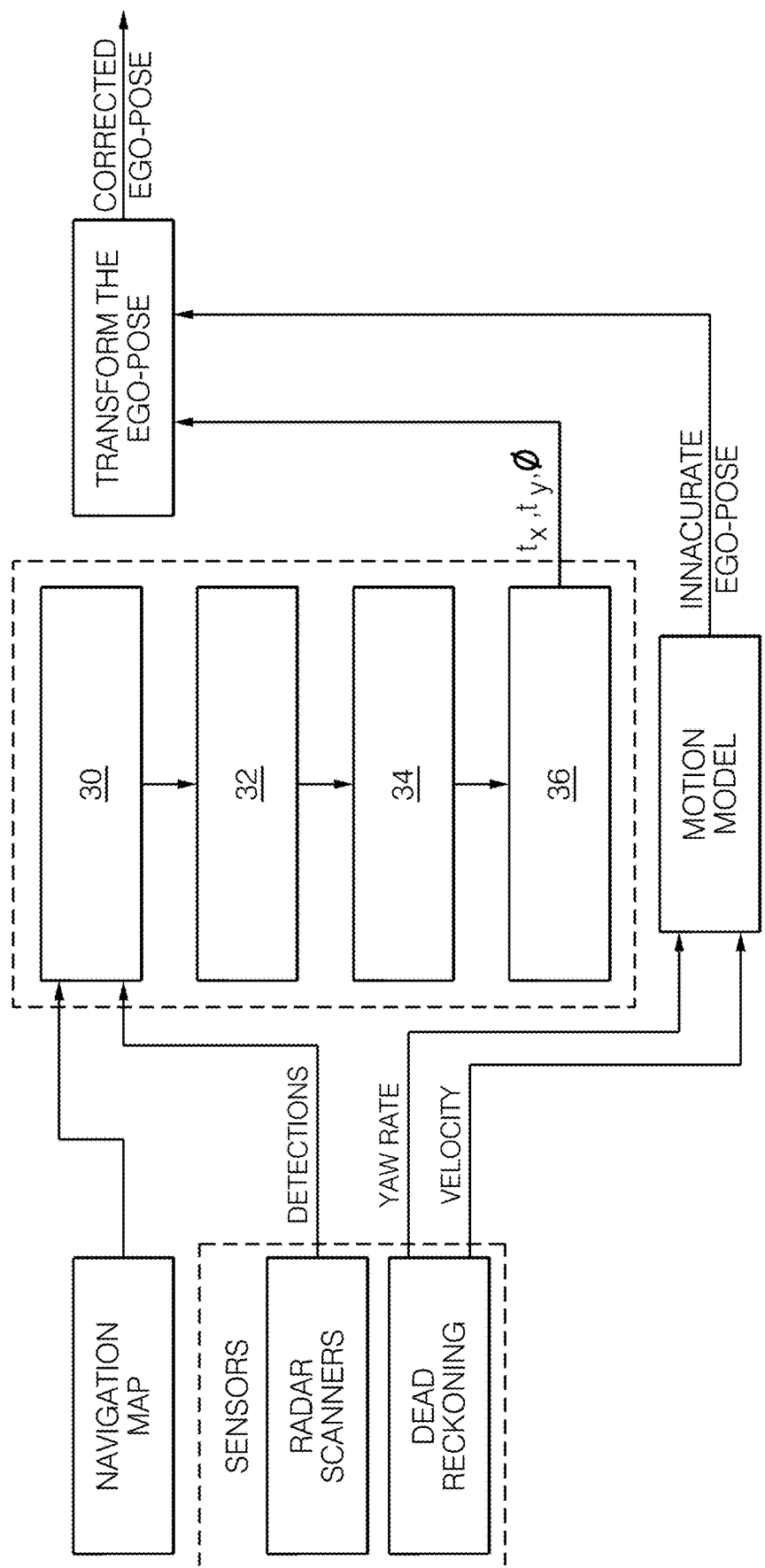
FIG. 4 is a schematic overview illustrating a method for determining the position of a vehicle equipped with a radar system and motion sensors.

FIG. 4 gives a schematic overview of a particular matching procedure as introduced above. The term "navigation map" refers to a plurality of elements stored in a database, wherein a selection of elements within a range of the radar system ("radar scanners") can form a predefined map which is fed into a processing block 30. This block 30 also receives a plurality of detection points ("detections") acquired by means of the radar system. In block 30, the nearest element is identified for each detection point. In block 32, an assignment to the nearest element is carried out if one or more conditions are fulfilled. One condition is that the distance to the nearest element must be below a predefined threshold. This is further illustrated in FIG. 5 which schematically shows a parking level 38 comprising a plurality of elements indicated as lines, e.g. the elements 40 and 42. The parking level 38 also comprises a plurality of parking spaces 44. These parking spaces 44 are preferably not coded by elements of the predefined map since they are not static landmarks in the sense of obstacles. The vehicle 10 has acquired a plurality of raw detection points 46 which form a cloud of detection points. Only a portion of the raw detection points 46 are assigned to the respective nearest element, namely the detection points 48 indicated as stars. These detection points 48 all have a distance to the nearest element below a threshold. These detection points 48 are assigned to the nearest element and form a subset of the raw detection points 46 used for further processing.

Figure 6:
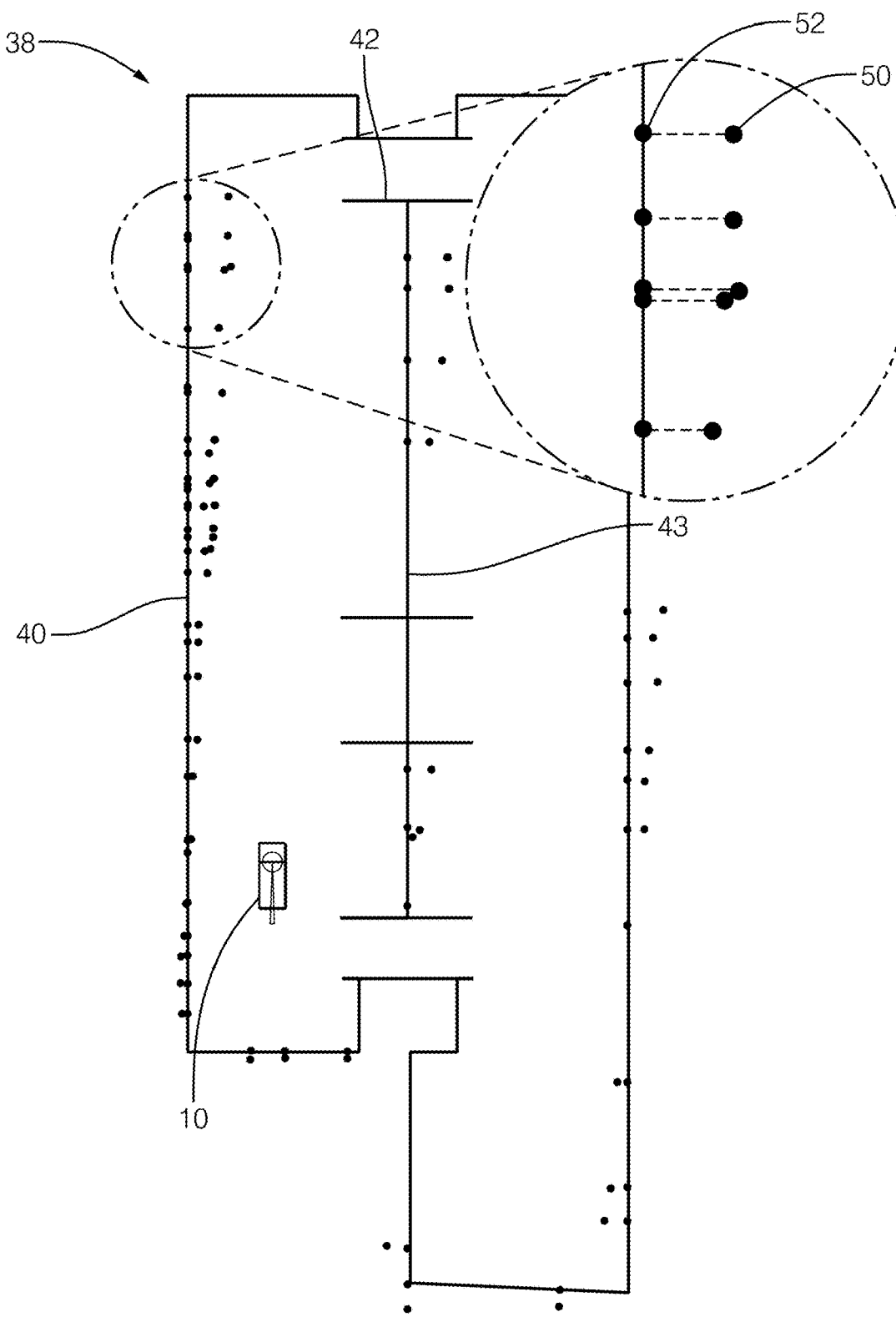
FIG. 6 is a schematic illustration of a predefined map representing a parking level, wherein the illustration further comprises a vehicle and a plurality of detection points acquired by means of a radar system of the vehicle, wherein an orthogonal projection of the detection points onto the nearest element of the predefined map is illustrated.

FIG. 6 illustrates how the distance between a detection point 50 and the nearest element 40 can be evaluated. In a mathematical sense, each detection point 50 can be orthogonally projected onto the nearest element 40, which gives an orthogonal projection 52. The distance between these two points is indicated as a dashed line the length of which is the Euclidean distance.

Figure 7:
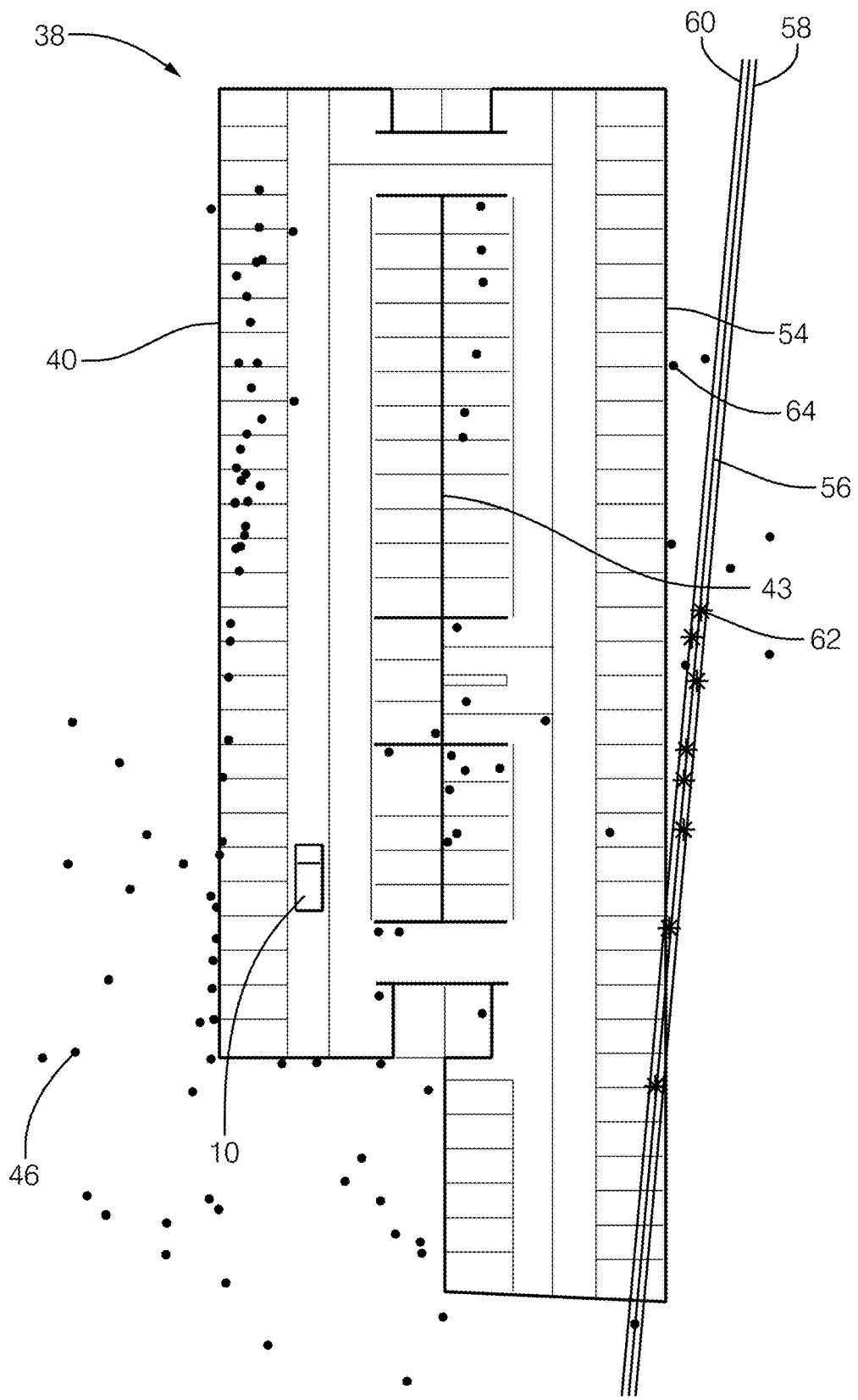
FIG. 7 illustrates a pre-filtering of detection points for a portion of detection points assigned to the right most element of the predefined map.

As an alternative to assigning detection points to the nearest element if the distance between them is below a threshold (cf. block 32 in FIG. 4), it is also possible to allow an assignment if the distance between the respective detection point and a complementary element 56 (cf. FIG. 7) is below a threshold. In FIG. 7, this complementary element 56 is a regression line evaluated on the basis of those detection points which are nearest to the element 54, e.g., the detection points 64, 62 in FIG. 7. For each of those detection points it is checked whether the distance to the complementary element 56 is below a threshold. This is equivalent to checking whether the position of the detection point is within a band between a first boundary 58 and a second boundary 60 with respect to the complementary element 56. If the detection point is within this band, the detection point is assigned to the element 54. In FIG. 7, this is the case for the detection points 62 indicated as asterisks.

Figure 8:
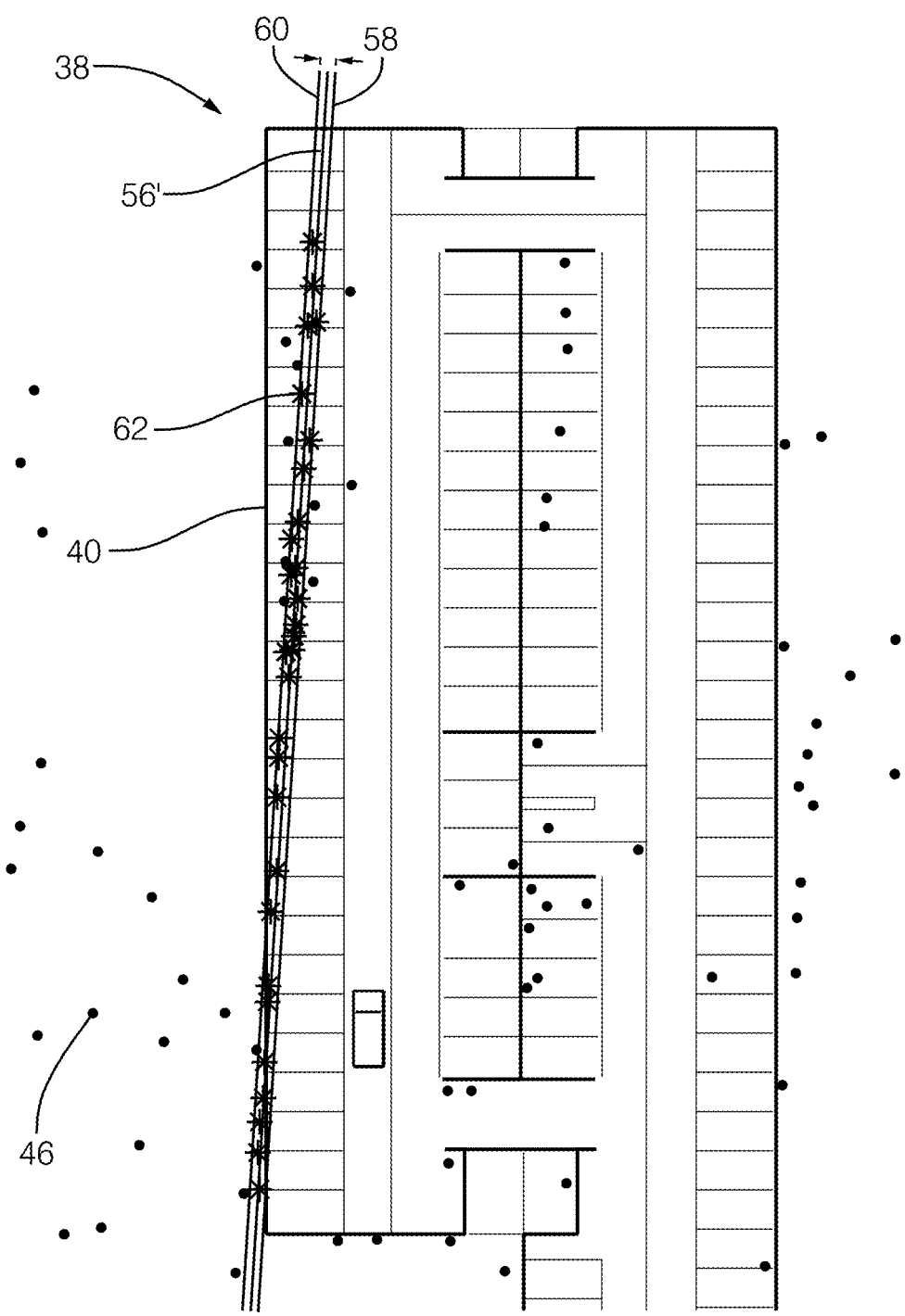
FIG. 8 illustrates a pre-filtering of detection points for a portion of detection points assigned to the left most element of the predefined map.
Figure 9:
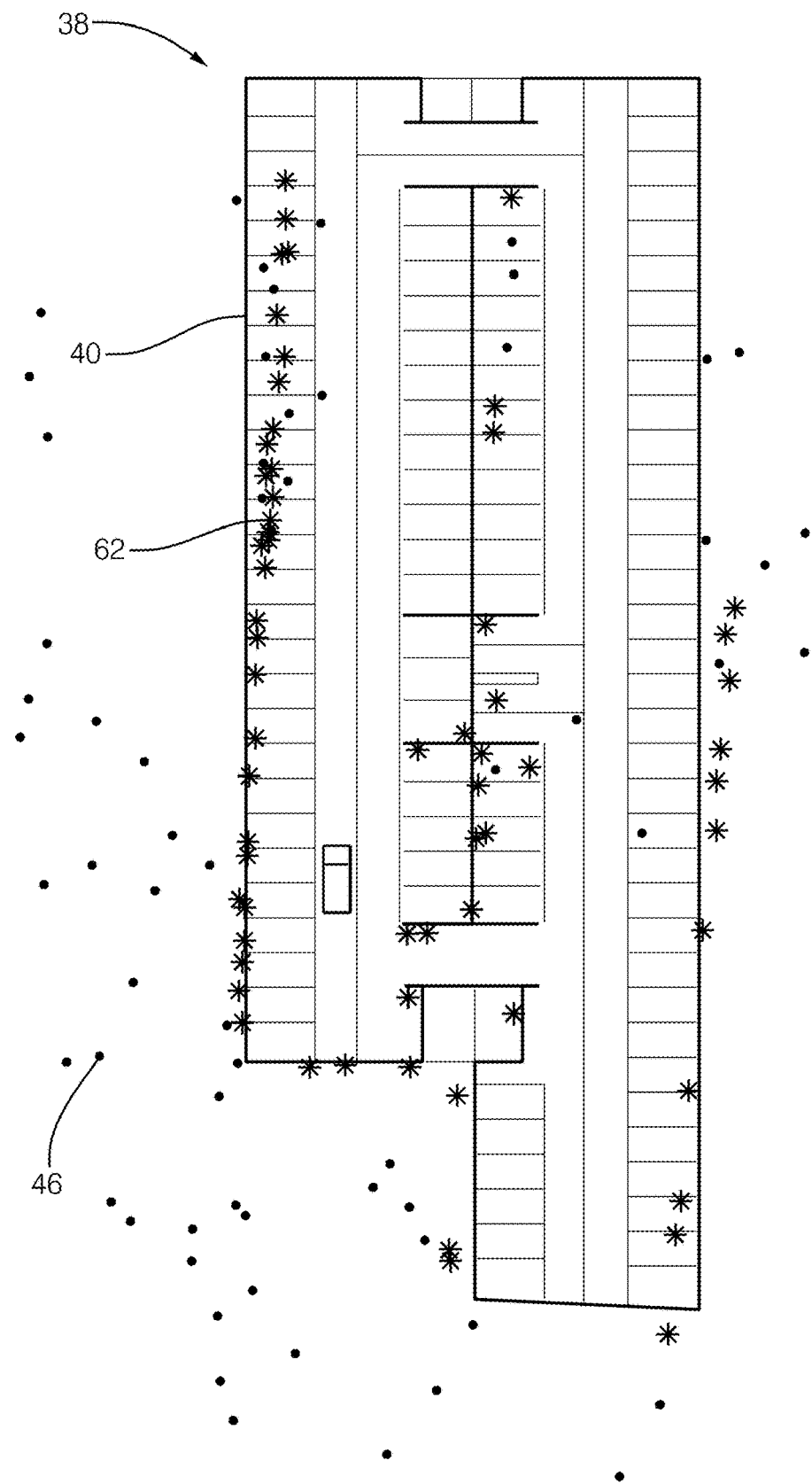
FIG. 9 illustrates a pre-filtering of detection points for a plurality of detection points assigned to nearest elements of the predefined map, respectively.

FIG. 8 illustrates a situation similar to the one of FIG. 7, wherein a complementary element 56' is evaluated for the detection points being nearest to the element 40, e.g., the detection points 62, 46. Eventually, this procedure is carried out for all detection points. The result is shown in FIG. 9, wherein the detection points 62 indicated as asterisks form the filtered subset outputted from block 32 for further processing in block 34 (cf. FIG. 4).

Figure 10:
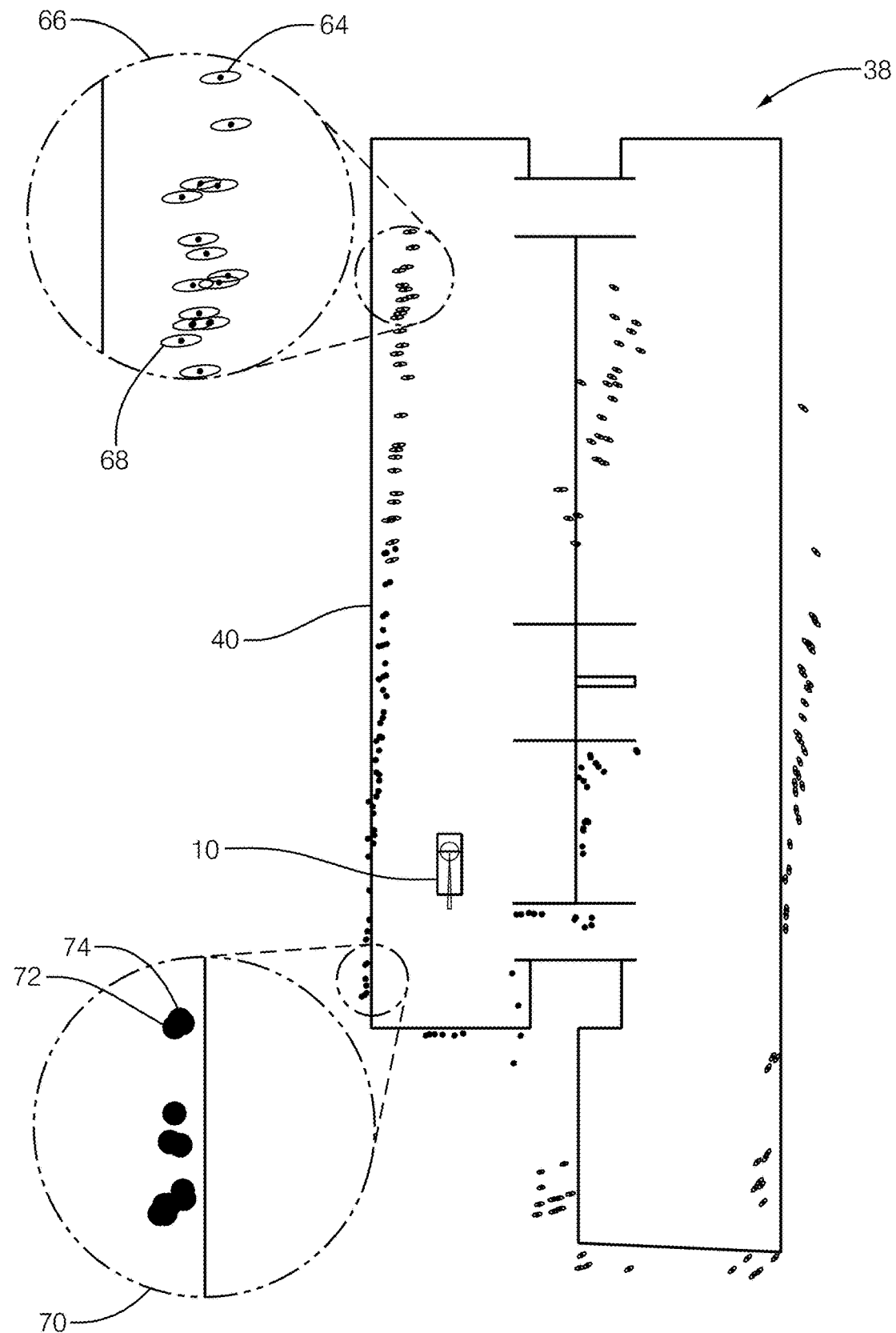
FIG. 10 illustrates an uncertainty associated with detection points.

Further processing of the filtered detection points 62 may comprise evaluating weights for the detection points according to their assumed uncertainty. This corresponds to block 34 of FIG. 4. A priori, each detection point is assumed to possess a certain, i.e. predefined measurement uncertainty which can be geometrically interpreted as an "area" around each detection point within which the true location represented by the detection point is assumed to be with high probability (i.e., the measurement uncertainty is modelled by a probability density function). This is effectively a probabilistic definition of the detection point, which may be represented as an individual covariance matrix for each detection point. This probabilistic approach is illustrated in FIG. 10 comprising two enlarged areas 66 and 70 adjacent to the element 40. In the enlarged area 66, an ellipse 68 is positioned around each of the detection points 64, thereby indicating an individual area of uncertainty associated with the respective detection point 64. Each of the ellipses 68 may be described by means of a covariance matrix. The uncertainty represented by the ellipses 68 may be parametric with respect to a measurement distance between the detection point and the radar sensor of the vehicle. Therefore, the uncertainty, i.e. the major axes of ellipses 68 may increase with the distance between the detection point and the associated radar sensor. This can be seen by comparing the ellipses 68 in the area 66 with the ellipses 72 for the detection points 74 in the enlarged area 70. In the latter case, the major axes of the ellipses 72 are much smaller due to the lower distance to the vehicle 10. The elliptic shape of the uncertainty is due to the fact that the uncertainty with respect to the distance ("first component") is lower than the uncertainty with respect to an angle about the line of sight between the detection point and the associated sensor ("second component").

Figure 11A:
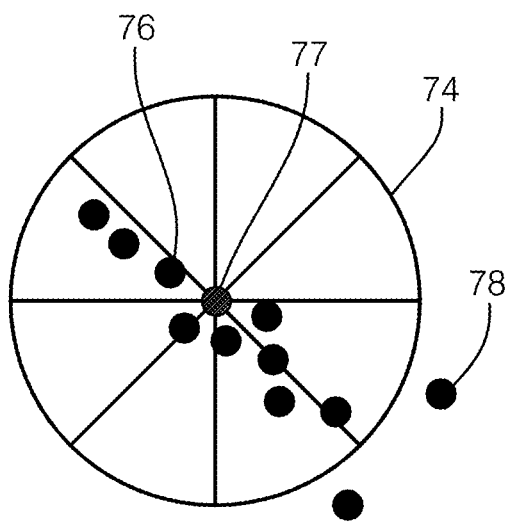
FIG. 11a illustrates a plurality of detections points and a circle centred with respect to one of the detection points, wherein the portion of detection points inside the circle form a group of detection points.
Figure 11B:
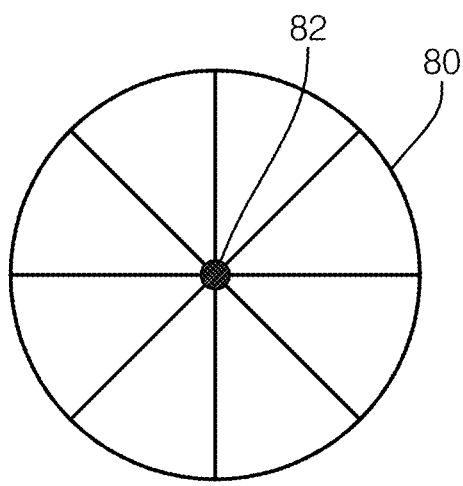
FIG. 11b illustrates a circle centred with respect to one detection point, wherein no other detection points are inside the circle.

From the perspective of measurement accuracy, usually not all detection points will have an equal accuracy, i.e. some detection points are more noisy than others. In this context, weights can be evaluated which represent an assumed degree of noisiness, i.e. uncertainty, for each detection point. These weights can then be used to modify a predefined uncertainty for each detection point in an individual way, as has been described further above. For a given detection point, a first weighting factor can be evaluated as illustrated in FIG. 11a. A circle 74, i.e. a first geometrical object is positioned centric around a given detection point 77. A quantity of detection points 76 sharing the circle 74 is determined by counting the number of detection points 76 within the circle 74. In FIG. 11a, the quantity is 9 (excluding the centric detection point 77). The detection points 78 outside the circle 74 have no influence on the quantity. In a comparison, the quantity associated with a detection point 82 in FIG. 11b is zero because apart from the detection point 82 no other detection points are inside a circle 80 around the detection point 82. Therefore, the given detection point 77 of FIG. 11a has a larger weighting factor than the given detection point 82 of FIG. 11b because the given detection point 77 is considered to be less noisy due to the higher number of adjacent detection points. As the skilled person understands, it is also possible to add the given detections 77, 82 to the respective quantities.

Figure 5:
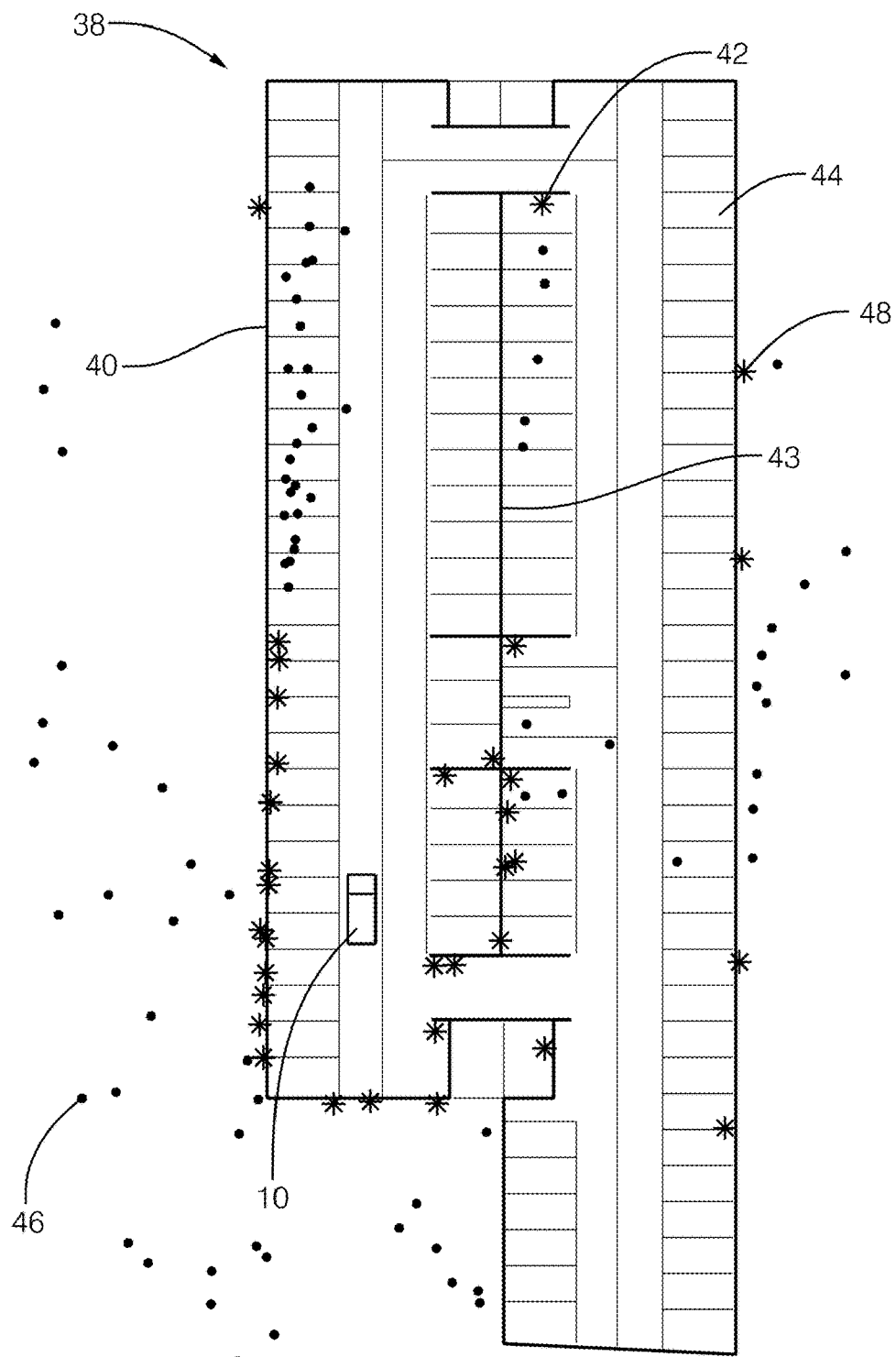
FIG. 5 is a schematic illustration of a predefined map representing a parking level, wherein the illustration further comprises a vehicle and a plurality of detection points acquired by means of a radar system of the vehicle.

A second weighting factor can be evaluated by counting the number of detection points which are assigned to a respective element. This is to say that the elements of the predefined map, such as the elements 40 and 43 in FIG. 5 are treated as second geometrical objects, wherein each detection point assigned to a respective element has a second weighting factor corresponding to the number of detection points which are assigned to the same respective element. Therefore, if many detection points are assigned to a single element then all of these detection points have a comparably large second weighting factor.

Figure 12:
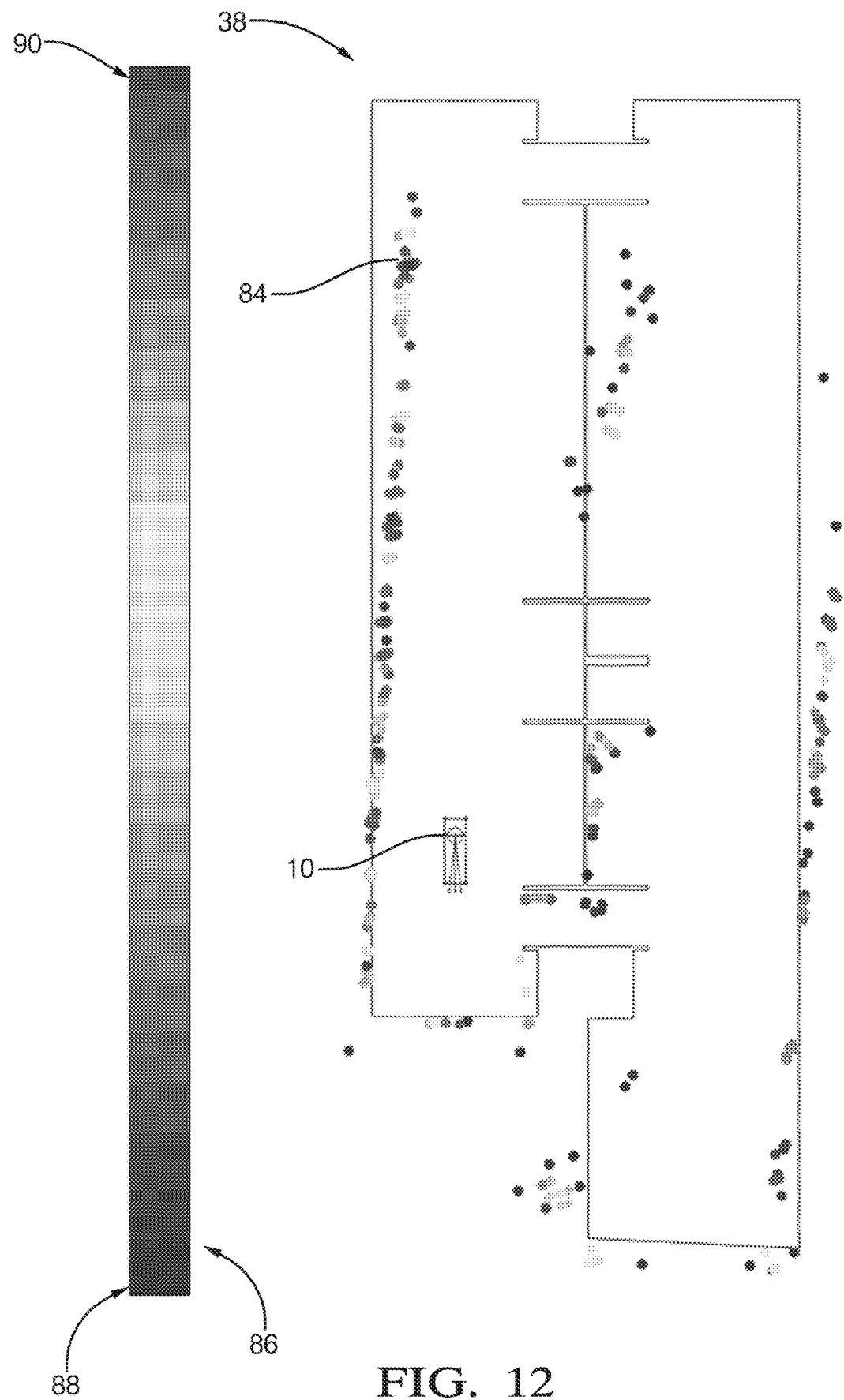
FIG. 12 illustrates evaluated weights for a plurality of detection points.

As described in detail further above, the first and second weighting factors can be multiplied. The resulting weights are illustrated in FIG. 12 by coding the weights by means of visual intensity. As shown by means of an intensity bar 86, the intensity values are between a minimum value 88 and a maximum value 90. The weights can be applied to the corresponding detection points by multiplying the inverse weights with the corresponding covariance matrices of the probabilistic model, as described in greater detail further above. The first and second weighting factors can also be combined in another way as multiplication or they can be used separately from each other.

Turning back to FIG. 4, the application of the weights can be carried out within the scope of block 36, which refers to determining a rigid (body) transformation function for correcting the inaccurate ego-pose of the vehicle 10. The rigid body transformation can comprise parameters $t_x$ and $t_y$ (translation) and parameter $\phi$ (rotation). These parameters can be found by minimizing the distances between the subset of detection points and the assigned elements. Transforming the inaccurate position with these parameters then gives the corrected position of the vehicle 10, which may be used for a wide range of applications, e.g. a valet parking application in the parking level 38, wherein the vehicle 10 automatically drives into a desired parking space 44 without requiring motor and steering control of the driver.

While this invention has been described in terms of the preferred embodiments thereof, it is not intended to be so limited, but rather only to the extent set forth in the claims that follow.

We claim:

1. A method for determining a position of a vehicle equipped with a radar system, wherein the radar system includes at least one radar sensor adapted to receive radar signals emitted from at least one radar emitter of the radar system and reflected in a vicinity of the vehicle towards the radar sensor, the method comprising:
acquiring at least one radar scan comprising a plurality of radar detection points, wherein each radar detection point is evaluated from a radar signal received at the radar sensor and representing a location in the vicinity of the vehicle in a vehicle coordinate system;
determining, from a database that includes map data representing a geo-structural model of a driving area that includes the location, a predefined map, the predefined map being a subset of the map data limited to the vicinity of the vehicle and including at least one element representing a static landmark in the vicinity of the vehicle, wherein the at least one element of the map comprises a straight line or a plane that provides a parametric model of the static landmark and information about a global position of the static landmark;
matching, using a rigid transformation function, at least a subset of the plurality of radar detection points of the at least one radar scan and the at least one element of the predefined map in a transformed vehicle coordinate system relative to the world coordinate system, the rigid transformation function being determined by minimizing distances between transformed radar detection points and the at least one element assigned to the plurality of radar detection points, the transformed radar detection points representing the subset of the plurality of radar detection points transformed to the transformed vehicle coordinate system using the rigid transformation function; and
determining the position of the vehicle in the world coordinate system based on the matching.

2. The method of claim 1, wherein the method does not comprise using data from a space-based radio-navigation system of the vehicle.

3. The method of claim 1, the method further comprising:
determining, using a pre-filtering of the plurality of radar detection points, the subset of the plurality of radar detection points to be matched, wherein the pre-filtering comprises, for each radar detection point of the plurality of radar detection points;
identifying, from the at least one element of the map data, a respective element having a minimum distance to a respective one of the plurality of radar detection points, and
assigning a respective element so identified to the respective one of the plurality of radar detection points if the distance is below a predefined threshold,
wherein the subset of the plurality of radar detection points includes all radar detection points from the plurality of radar detection points to which an element has been assigned.

4. The method of claim 1,
wherein determining the rigid transformation function comprises minimizing $$F(P, R, t) = \sum_{i=1}^{m} \left[ n_i^T (R p_i + t) - b_i \right]^2,$$

wherein
P represents the subset of m radar detection points,
R represents a rotation,
t represents a translation,
$p_i$ represents the i-th radar detection point of P, b₁ represents an orthogonal distance to the element assigned to the i-th radar detection point of P,
$n_i^T$ represents a transpose of a normal vector with respect to the element assigned to the i-th radar detection point of P.

5. The method of claim 1, wherein determining the rigid transformation function comprises a probabilistic model, wherein at least one parameter of the probabilistic model represents an expected variance of a respective one of the plurality of radar detection points, wherein the expected variance is non-constant.

6. The method of claim 5, wherein:
for a respective radar detection point, the expected variance of the radar detection point comprises a first component and a second component,
the first component representing the expected variance with respect to a distance between the location in the vicinity of the vehicle represented by the radar detection point and the at least one radar sensor,
the second component representing the expected variance with respect to an angle identifying a direction of the location in the vicinity of the vehicle represented by the radar detection point relative to the at least one radar sensor, and
the first component being smaller than the second component.

7. The method of claim 1, wherein the method further comprises
determining, from a motion model of the vehicle, a preliminary position of the vehicle,
wherein determining the position of the vehicle comprises transforming the preliminary position using the rigid transformation function.

8. The method of claim 7, wherein the motion model is determined based on at least one measurement from at least one motion sensor of the vehicle and/or on the basis of at least some of the plurality of radar detection points.

9. The method of claim 8, wherein the measurement from the at least one motion sensor comprises a velocity or a yaw rate of the vehicle.

10. The method of claim 1, wherein the position of the vehicle comprises coordinates representing a location and an orientation of the vehicle.

11. The method of claim 1, wherein the subset of the plurality of radar detection points includes radar detection points from a plurality of successive radar scans of the radar system, in particular 1 to 20 scans, preferably 10 scans, wherein a scan rate of the radar system is between 10 to 40 Hz, preferably 20 Hz.

12. A vehicle comprising:
a radar system, the radar system including at least one radar sensor adapted to receive radar signals emitted from at least one radar emitter of the radar system and reflected in a vicinity of the vehicle towards the radar sensor; and
a control and processing unit configured to:
acquire at least one radar scan comprising a plurality of radar detection points, wherein each radar detection point is evaluated from the radar signals received at the radar system and representing a location in the vicinity of the vehicle in a vehicle coordinate system;
determine, from a database that includes map data representing a geo-structural model of a driving area that includes the location, a predefined map, the predefined map being a subset of the map data limited to the vicinity of the vehicle and including at least one element representing a static landmark in the vicinity of the vehicle, wherein the at least one element of the map comprises a straight line or a plane that provides a parametric model of the static landmark and information about a global position of the static landmark;
match, using a rigid transformation function, at least a subset of the plurality of radar detection points of the at least one radar scan and the at least one element of the predefined map in a transformed vehicle coordinate system relative to the world coordinate system, the rigid transformation function being determined by minimizing distances between transformed radar detection points and the at least one element assigned to the plurality of radar detection points, the transformed radar detection points representing the subset of the plurality of radar detection points transformed to the transformed vehicle coordinate system using the rigid transformation function; and
determine a position of the vehicle in the world coordinate system based on the match.

13. The vehicle of claim 12, wherein the control and processing unit does not use data from a space-based radio-navigation system of the vehicle to determine the position of the vehicle.

14. The vehicle of claim 12, wherein the control and processing unit is further configured to:
determine, using a pre-filtering of the plurality of radar detection points, the subset of the plurality of radar detection points to be matched, the pre-filtering comprises, for each radar detection point of the plurality of radar detection points:
identifying, from the at least one element of the map data, a respective element having a minimum distance to a respective one of the plurality of radar detection points, and
assigning a respective element so identified to the respective one of the plurality of radar detection points if the distance is below a predefined threshold,
wherein the subset of the plurality of radar detection points includes all radar detection points from the plurality of radar detection points to which an element has been assigned.

15. The vehicle of claim 12, wherein determining the rigid transformation function comprises a probabilistic model, wherein at least one parameter of the probabilistic model represents an expected variance of a respective one of the plurality of radar detection points, wherein the expected variance is non-constant.

16. The vehicle of claim 15, wherein, for a respective radar detection point, the expected variance of the respective radar detection point comprises a first component and a second component, the first component representing the expected variance with respect to a distance between the location in the vicinity of the vehicle represented by the radar detection point and the at least one radar sensor, the second component representing the expected variance with respect to an angle identifying a direction of the location in the vicinity of the vehicle represented by the radar detection point relative to the at least one radar sensor, and the first component being smaller than the second component.

17. The vehicle of claim 12, wherein the control and processing unit is further configured to:
determine, from a motion model of the vehicle, a preliminary position of the vehicle by transforming the preliminary position using the rigid transformation function.

18. A non-transitory computer-readable storage medium comprising computer-executable instructions that, when executed, cause a control and processing unit in a vehicle equipped with a radar system, the radar system including at least one radar sensor adapted to receive radar signals emitted from at least one radar emitter of the radar system and reflected in a vicinity of the vehicle towards the radar sensor, to:

acquire at least one radar scan comprising a plurality of radar detection points, wherein each radar detection point is evaluated from a radar signal received at the radar sensor and representing a location in the vicinity of the vehicle in a vehicle coordinate system;

determine, from a database that includes map data representing a geo-structural model of a driving area that includes the location, a predefined map, the predefined map being a subset of the map data limited to the vicinity of the vehicle and including at least one element representing a static landmark in the vicinity of the vehicle, wherein the at least one element of the map comprises a straight line or a plane that provides a parametric model of the static landmark and information about a global position of the static landmark;

match, using a rigid transformation function, at least a subset of the plurality of radar detection points of the at least one radar scan and the at least one element of the predefined map in a transformed vehicle coordinate system relative to the world coordinate system, the rigid transformation function being determined by minimizing distances between transformed radar detection points and the at least one element assigned to the plurality of radar detection points, the transformed radar detection points representing the subset of the plurality of radar detection points transformed to the transformed vehicle coordinate system using the rigid transformation function; and determine a position of the vehicle in the world coordinate system based on the match.

19. The non-transitory computer-readable storage medium of claim 18, wherein the non-transitory computer-readable storage medium further comprises computer-executable instructions that, when executed, cause the control and processing unit to:

determine, using a pre-filtering of the plurality of radar detection points, the subset of the plurality of radar detection points to be matched, the pre-filtering comprises, for each radar detection point of the plurality of radar detection points:

identifying, from the at least one element of the map data, a respective element having a minimum distance to a respective one of the plurality of radar detection points, and assigning a respective element so identified to the respective one of the plurality of radar detection points if the distance is below a predefined threshold, wherein the subset of the plurality of radar detection points includes all radar detection points from the plurality of radar detection points to which an element has been assigned.

20. The non-transitory computer-readable storage medium of claim 18, wherein determining the rigid transformation function comprises a probabilistic model, at least one parameter of the probabilistic model representing an expected variance of a respective one of the plurality of radar detection points and the expected variance being non-constant.

* * * * *